UNITED STATES PATENT OFFICE.

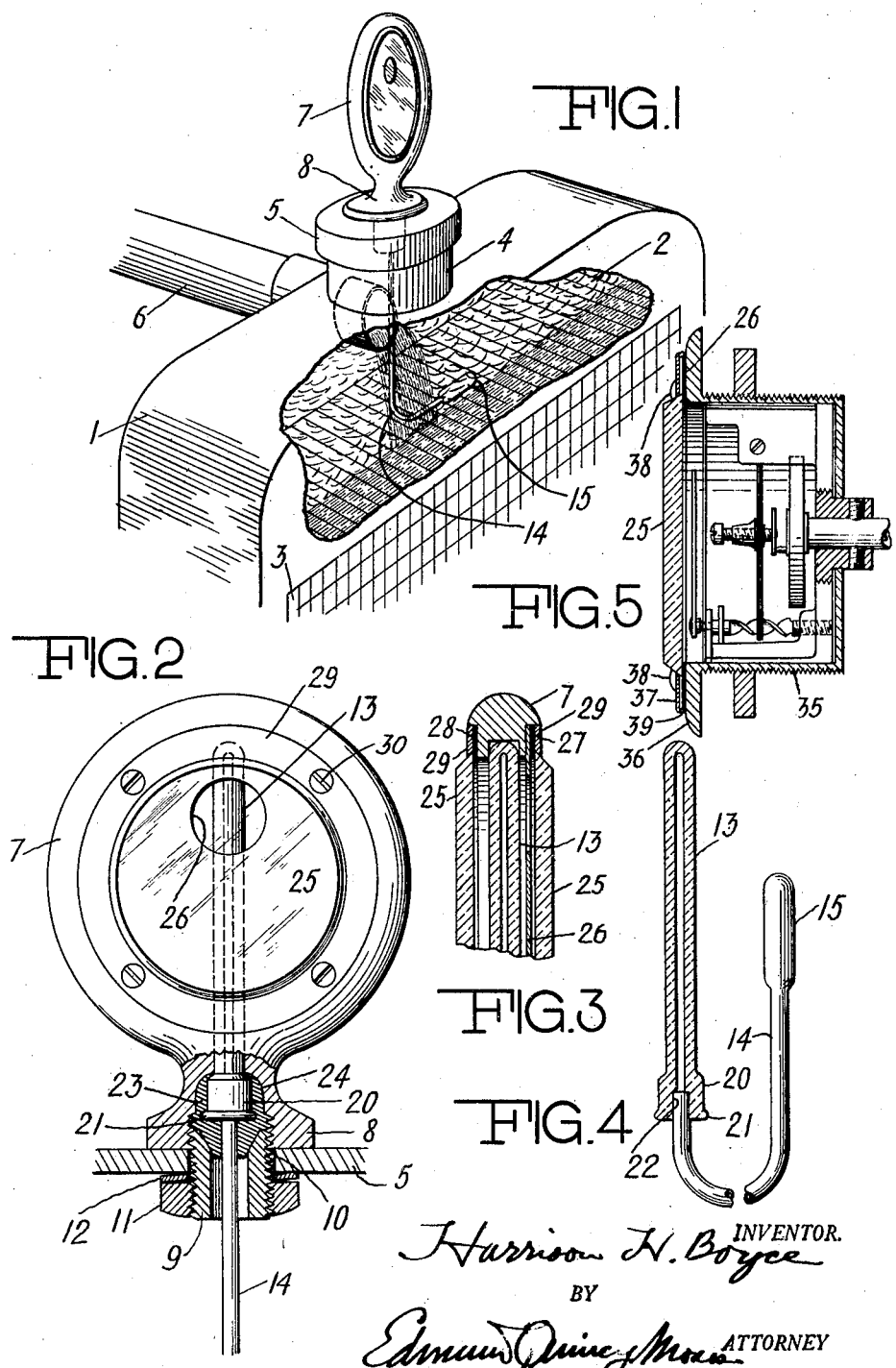

HARRISON HURLBERT BOYCE, OF FOREST HILLS, NEW YORK.

INSTRUMENT.

1,385,661.  Specification of Letters Patent.  Patented July 26, 1921.

Application filed July 14, 1917. Serial No. 180,579.

*To all whom it may concern:*

Be it known that I, HARRISON HURLBERT BOYCE, a citizen of the United States, residing at Forest Hills, in the county of Queens and State of New York, have invented certain new and useful Improvements in Instruments, of which the following is a full, clear, and exact description.

This invention relates to certain improvements in the construction of instruments and more particularly to temperature indicating instruments. In my application for Patent Serial No. 846,247, filed June 20th, 1914, I have disclosed certain improvements in temperature indicating devices for internal combustion engines, one of these improvements contemplating particularly the mounting of an instrument on the radiator cap of an automobile and providing it with a temperature responsive element so constructed as to be adjustable in its relationship to the instrument whereby it may be located at the lowest practical level in the radiator and normally remain immersed in the water therein. One of the described modes for accomplishing this result embodies the use of a flexible tube depending from the instrument and having a bulb at its lower end. The present invention embodies certain improvements in the construction of an instrument of this character whereby a glass tube indicator may be located in the instrument on the radiator cap or in any other suitable location and a flexible metal tube and bulb portion be introduced into the medium, the temperature of which is to be indicated such as the water in the radiator. One part of the present invention relates to an instrument of this character and to novel means for uniting the glass tube and flexible metal tube. This improvement is applicable to the union of tubes of this character under the conditions named or in any similar situation. Another feature of the invention relates to the use of an improved packing and sealing material for mounting the crystals or other parts of an instrument, particularly an instrument subject to temperature conditions higher than normal. This feature, however, is covered by a divisional application for patent, Serial No. 478,317 filed June 17, 1921.

In the accompanying drawings which form a part of this specification and in which are shown certain preferred embodiments of the invention, Figure 1 is a perspective view showing the upper part of an automobile radiator partly broken away, and disclosing the return pipe, filler neck, and radiator filler cap, one form of instrument embodying the invention being shown mounted on the radiator cap.

Fig. 2 is a front view partly in vertical section of an instrument of the form shown in Fig. 1.

Fig. 3 is a transverse vertical section of the instrument.

Fig. 4 is a detail view of the glass tube and flexible metal tube, the former being shown in longitudinal section.

Fig. 5 is a vertical sectional view of a modified form of instrument embodying the packing and sealing feature of the invention.

Referring to the drawings in detail, numeral 1 designates the radiator of an automobile or the like, having the usual upper tank 2 and bank of tubes 3. 4 is the filler neck closed by the removable filler cap 5. The hot water from the engine cylinder is introduced into the upper tank through the return pipe 6 in the usual manner. The temperature indicating instrument shown in Figs. 1 to 4 comprises a frame 7 having a base 8 which rests on the filler cap and is secured thereto in any suitable manner. As illustrated a sleeve or nipple 9 carried by the instrument projects through an opening 10 in the filler cap and is engaged by a nut 11 which clamps the instrument and filler cap together. A spring washer 12 is preferably interposed between the nut and the filler cap as this prevents any undue looseness in the mounting of the instrument on the cap, at the same time permitting the instrument to be rotated thereon. This renders it possible to orient the instrument after the filler cap has been screwed tight on the filler neck. The indicating part of the instrument comprises a capillary glass tube 13 mounted in the frame 7 and united at its lower end with a flexible tube 14 leading into the radiator and terminating in the bulb 15. The mercury, spirits or other suitable indicating fluid fills the bulb and flexible tube and extends up into the glass tube to a height depending upon the temperature at the bulb and consequent degree of expansion of the liquid. Thus it will be seen that a construction is provided which indicates in the manner of an ordinary glass liquid expansion thermometer but in which a portion of the thermometer is flexible so that it may be adaptable to the particular conditions of use. The construction is particularly useful in connection with instruments mounted on vehicle radiators where it is desired to indicate the actual temperature of the water in the radiator for the reason that it is possible to make the flexible tube of such length that the bulb will reach the top of the bank of tubes in radiators having the deepest top tanks. The instrument may then be used interchangeably on any radiator as the tube will simply bend over when introduced into a radiator having a top tank which is not so deep. If the actual water temperature is to be taken it is important to have the bulb extend down as far as possible as this lessens the danger of the bulb becoming exposed if the radiator is not kept entirely full. The flexible tube may also be successfully used in many cases in radiators having baffle plates over the return pipe openings as it is possible to work the tube past the baffle plates so as to get the bulb well down into the water in the lower part of the top tank.

The union of the metal tube to the glass tube must be carefully made so as to be proof against leakage and the ends of the bores in the tubes should be brought together as closely as possible so as to avoid the formation of a pocket, the expansion of the liquid in which would affect the accuracy of the reading. Furthermore the small metal tubing of the character used is difficult to handle and to engage by fittings of the types satisfactorily employed for pipes or tubes of larger size. I have devised a very satisfactory mode of uniting the tubes which fulfils all of the mechanical requirements and at the same time is very inexpensive. In accordance with this part of my invention I form a recess in the lower end of the glass tube into which I insert the end of the small flexible metal tube and then mold or cast a binding material around the joint. In the preferred construction illustrated the glass tube 13 is formed at its lower end with an enlargement 20 terminating in a flange or bead 21. Inside of the enlargement, in axial alinement with the capillary bore of the tube is formed a recess 22 into which fits closely the end of the metal tube. A mass of binding material 23 is then formed around the joint, it engaging with the shoulder formed by the bead 21 and with the adjacent portion of the metal tube so as to hold the metal tube and glass tube firmly together. I prefer to employ for this purpose a metal of low melting point such as solder which will unite firmly with the metal tube and which is impervious. In the construction of an instrument such for instance as that shown in Figs. 1, 2 and 3 the joint is preferably formed in a recess in the base of the instrument such recess being illustrated at 24 in Fig. 2. The glass tube may be placed in the frame with the end of the flexible tube inserted in recess 22 and the fusible metal cast directly in the recess 24 around the joint. The sleeve 9 retains the body of metal in the recess and may, when desired, be employed to put pressure upon the metal so as to force it into even more firm contact with the tubes.

Another feature of my invention relates to the use of an improved packing or sealing material for the casing or housing of an instrument. In the form of instrument illustrated in Figs. 1 to 4, the glass tube 13 extending across the frame 7 is inclosed between the crystals 25, a dial plate 26 being mounted back of the tube. In order to provide a yielding seat for the crystals, packing rings 27 are placed under the crystals in annular recesses 28 in the frame. The crystals are held in position in engagement with the packing rings by retaining rings 29 secured in any suitable manner as by screws 30. The packing rings are preferably made of a pervious material such as paper or card-board, or in some instances felt might be employed, and impregnated with a substance such as paraffin. When the instrument becomes heated to some extent, the paraffin will fuse and soften and will run into any cracks or crevices which exist under the edge of the crystal so as to effectually seal the crystal in position. This will prevent the entrance of dust or moisture into the casing which might accumulate on the inner surface of the crystal, the dial or the tube so as to interfere with the proper reading of the instrument and render the same unsightly. The paraffin paper is moreover very cheap and is durable, being superior to rubber in this respect as it will withstand indefinitely considerable temperatures. Rubber on the other hand when utilized as a packing material in an instrument subjected to heat will rapidly deteriorate.

In Fig. 5 I have shown another application of the packing and sealing ring of paraffin-impregnated material. As here illustrated the improvement is shown as embodied in a gage mounted on the dash of a motor vehicle where it is likely to be subjected to considerable temperatures owing to its location near the motor. The instrument has a casing 35 which is adapted to extend through a hole in the dash and is provided at the front with a flange 36 which is adapted to engage the outer face of the dash to which flange the crystal 25 is clamped by a ring 37 secured in position by screws 38 or in any other suitable manner. The paraffined packing ring 26 is inserted between the flange 36 and the edge of the crystal 25. It is retained against lateral displacement while the parts are being assembled by the flange 39 of the retaining ring which also assures a neat finish.

While in the foregoing specification and in the accompanying drawings I have shown and described in detail certain preferred forms of my invention as illustrative of the best mode now known to me for practising the same it will be understood that my invention is not limited to these embodiments but may be otherwise employed and that some features of the invention may be utilized without others. I wish to be understood therefore as intending to cover my invention broadly in whatever form its principle may find embodiment.

Having thus described my invention, I claim:

1. In an instrument of the character described, the combination of a transparent indicating tube of capillary bore, a flexible metal tube of capillary bore, the end of one of said tubes fitting within a recess formed in the end of the other tube, and a mass of binding material molded around and inclosing the joined ends of both tubes so as to firmly unite the ends of said tubes.

2. In an instrument of the character described, the combination of a glass indicating tube of small bore having a recess in one end thereof, a small bore flexible metal tube having its end inserted in said recess, and means for firmly uniting the ends of the tubes.

3. In an instrument of the character described, the combination of a glass indicating tube enlarged at one end to provide a shoulder and having a recess therein, a small bore metal tube having its end inserted in said recess, and a mass of binding material molded around the shouldered end of said glass tube and adjacent portion of the metal tube.

4. In an instrument of the character described, the combination of a frame having a recess therein, a glass tube carried by said frame and having a portion extending into said recess, a metal tube having a portion extending into said recess, and a mass of metal in said recess surrounding and uniting the adjacent ends of said metal and glass tubes.

5. In an instrument of the character described, the combination of a frame having a base with a recess therein, a glass tube mounted in said frame and having an enlarged lower end portion extending into said recess, a flexible metal tube having its upper end extending into a recess in the enlarged portion of said glass tube, a mass of metal in said recess formed around the enlarged portion of the glass tube and engaging the adjacent end of the metal tube, and a screw threaded nipple having an opening through which said flexible tube projects, said nipple screwing into said recess and engaging the mass of metal therein.

HARRISON HURLBERT BOYCE.